United States Patent [19]
Spatafora

[11] Patent Number: 5,490,368
[45] Date of Patent: Feb. 13, 1996

[54] WRAPPING MACHINE, PARTICULARLY FOR FOOD PRODUCTS SUCH AS SWEETS AND SIMILAR

[75] Inventor: Mario Spatafora, Bologna, Italy

[73] Assignee: Azionaria Costruzioni Macchine Automatiche A.C.M.A. S.p.A., Bologna, Italy

[21] Appl. No.: 187,861

[22] Filed: Jan. 28, 1994

[30] Foreign Application Priority Data

Jan. 29, 1993 [IT] Italy .................. BO93A0021

[51] Int. Cl.⁶ .................................................. B65B 11/28
[52] U.S. Cl. .................................................. 53/234; 53/251
[58] Field of Search .................... 53/251, 250, 234, 53/225, 544

[56] References Cited

U.S. PATENT DOCUMENTS

| | | | |
|---|---|---|---|
| 3,890,766 | 6/1975 | Hatta | 53/234 |
| 4,408,435 | 10/1983 | Sutton | 53/234 X |
| 4,539,791 | 9/1985 | Zamboni | 53/234 |
| 4,558,555 | 12/1985 | Rueff et al. | 53/251 X |
| 4,823,536 | 4/1989 | Manservigi et al. | 53/234 X |
| 5,251,740 | 10/1983 | Spatafora et al. | 198/458 |
| 5,291,985 | 3/1994 | Spatafora et al. | 198/419.3 |
| 5,301,792 | 4/1994 | Spatafora et al. | 198/408 |

FOREIGN PATENT DOCUMENTS

| | | |
|---|---|---|
| 3407220 | 8/1985 | Germany . |
| 2220187 | 1/1990 | United Kingdom . |

*Primary Examiner*—James F. Coan
*Attorney, Agent, or Firm*—Oblon, Spivak, McClelland, Maier & Neustadt

[57] ABSTRACT

A wrapping machine wherein a wrapping device is supplied with an orderly succession of products by a transfer device which, at an input station, successively removes the products off a feed device traveling through the input station in a given direction. The transfer device presents at least a gripping device in turn presenting jaws moving in a plane for gripping a respective product at the input station, and which rotates about an axis for selectively positioning the plane of the jaws in a first position substantially parallel and in a second position substantially perpendicular to the traveling direction of the feed device.

10 Claims, 3 Drawing Sheets

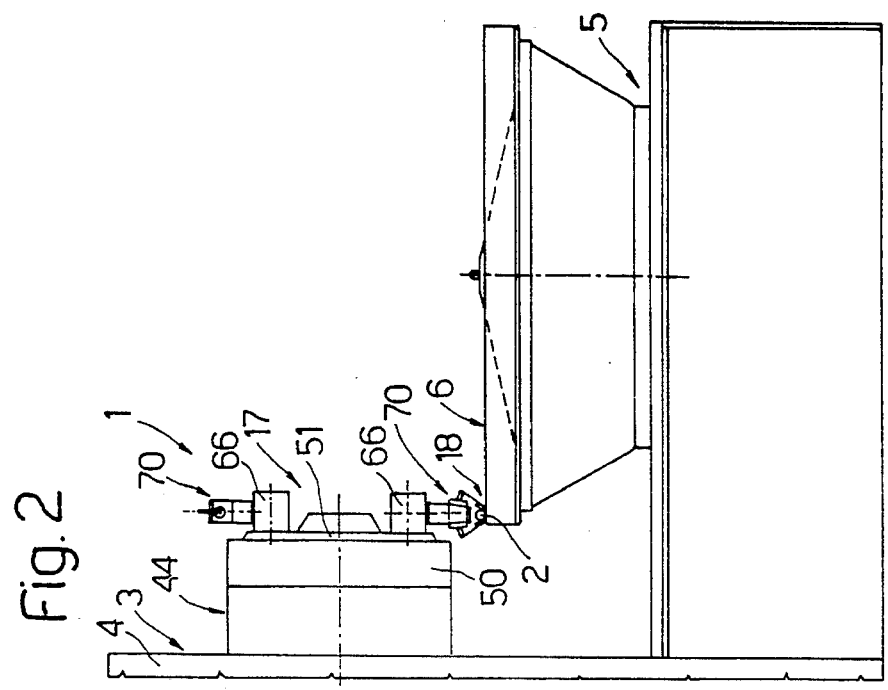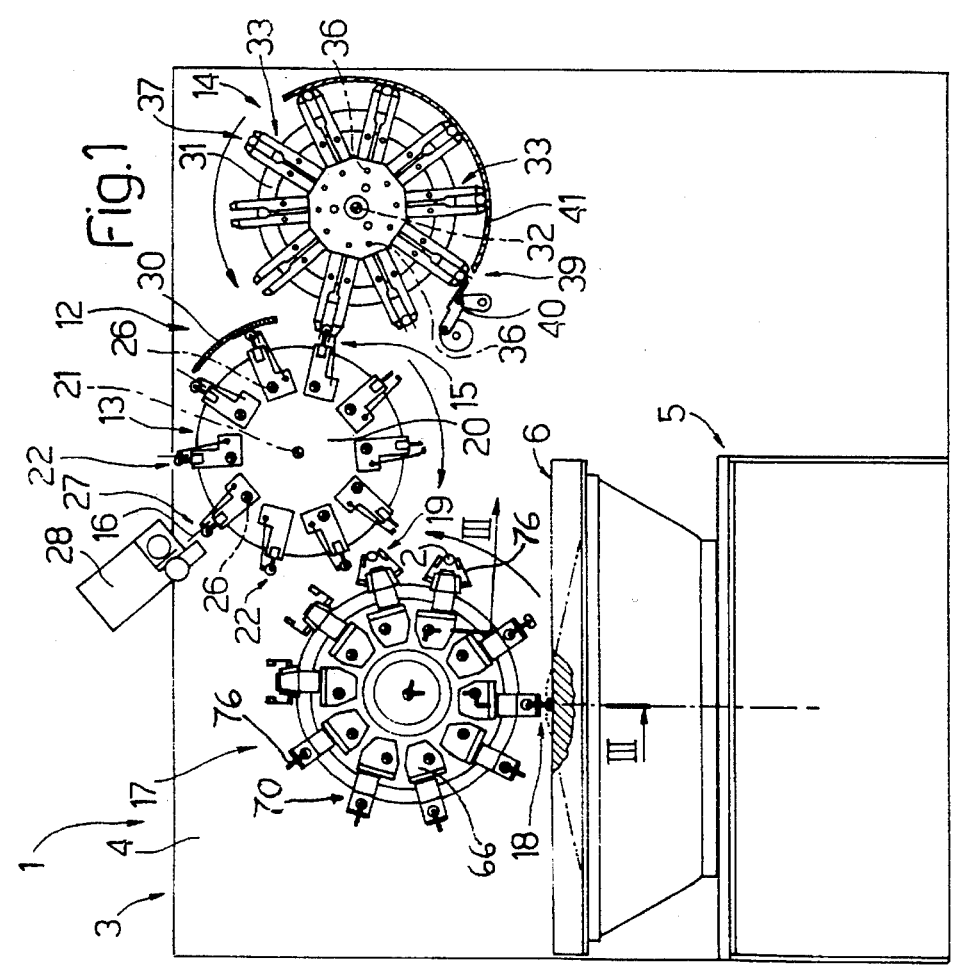

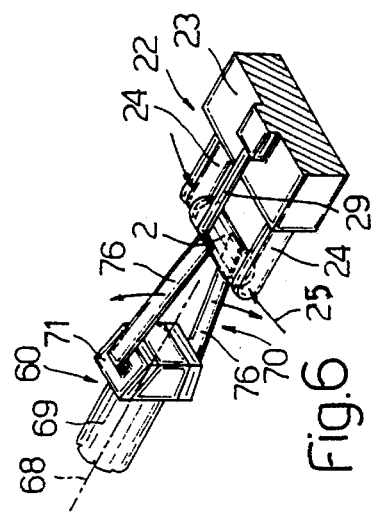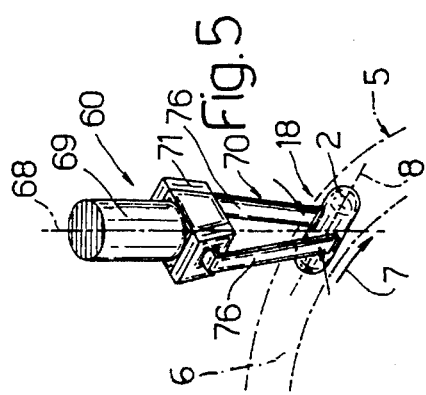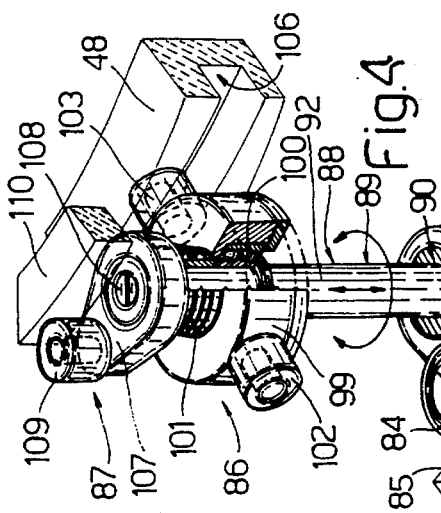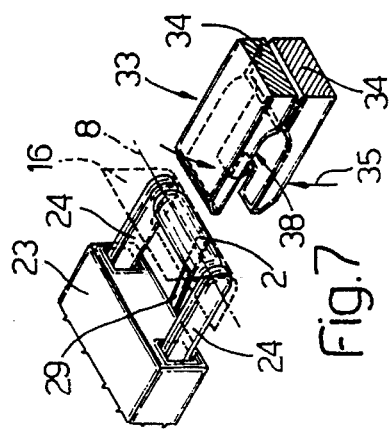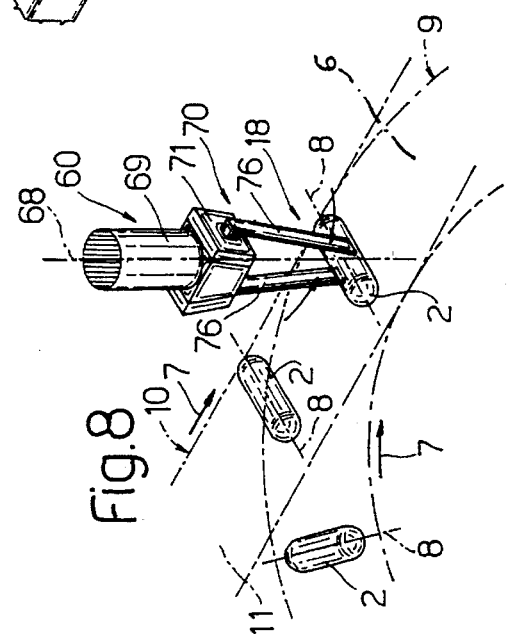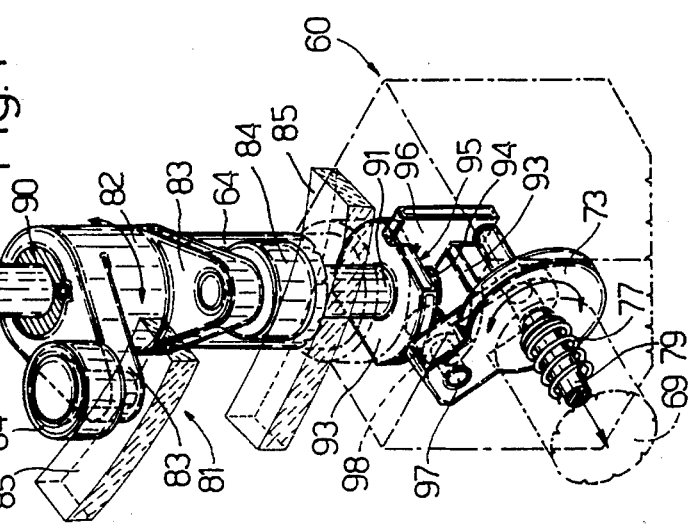

5,490,368

1

WRAPPING MACHINE, PARTICULARLY FOR FOOD PRODUCTS SUCH AS SWEETS AND SIMILAR

BACKGROUND OF THE INVENTION

The present invention relates to a wrapping machine, particularly for food products such as sweets and similar.

In particular, the present invention relates to a wrapping machine, a first portion of which provides for forming about each product a tubular wrapping which may be laterally heat sealed or left open, and a second portion of which provides for closing the opposite axial ends of the tubular wrapping about the product to form a known closed wrapping with folded and/or heat sealed or twisted ends.

Known machines of the aforementioned type generally present a feed device by which the products are fed to the machine in an orderly equally spaced succession and oriented a given way in relation to the traveling direction. The way the products—normally more or less elongated in shape—are oriented in relation to the traveling direction is a decisive factor in determining the design of the wrapping machine, so that known machines of the aforementioned type are generally "special purpose" types, i.e. designed exclusively for wrapping a given product oriented a given way for supply to the machine.

As a result, known machines of the above type are invariably expensive to produce and, for lack of versatility, rapidly become obsolete.

SUMMARY OF THE INVENTION

It is an object of the present invention to provide a substantially "universal" wrapping machine of the aforementioned type, i.e. capable of wrapping products, in particular elongated products, regardless of how they are oriented for supply to the machine.

According to the present invention, there is provided a wrapping machine, particularly for food products such as sweets and similar, comprising an input station for an orderly succession of said products supplied to the input station in a given direction; a device for wrapping said products; a loading station for loading said products on to the wrapping device; and a transfer device for transferring said succession from the input station to the loading station; the transfer device comprising at least a gripping device moving between the input and loading stations; and the gripping device comprising jaw means moving in a plane for gripping a respective product at the input station; characterized by the fact that said gripping device rotates about a first axis for selectively positioning said plane in a first position substantially parallel and in a second position substantially perpendicular to said traveling direction at said input station.

The above wrapping machine preferably presents first actuating means connected to the gripping device, for selectively positioning said plane in said first and second positions.

BRIEF DESCRIPTION OF THE DRAWINGS

A non-limiting embodiment of the present invention will be described by way of example with reference to the accompanying drawings, in which:

FIG. 1 shows a front view of a preferred embodiment of the wrapping machine according to the present invention;

2

Figure 3:
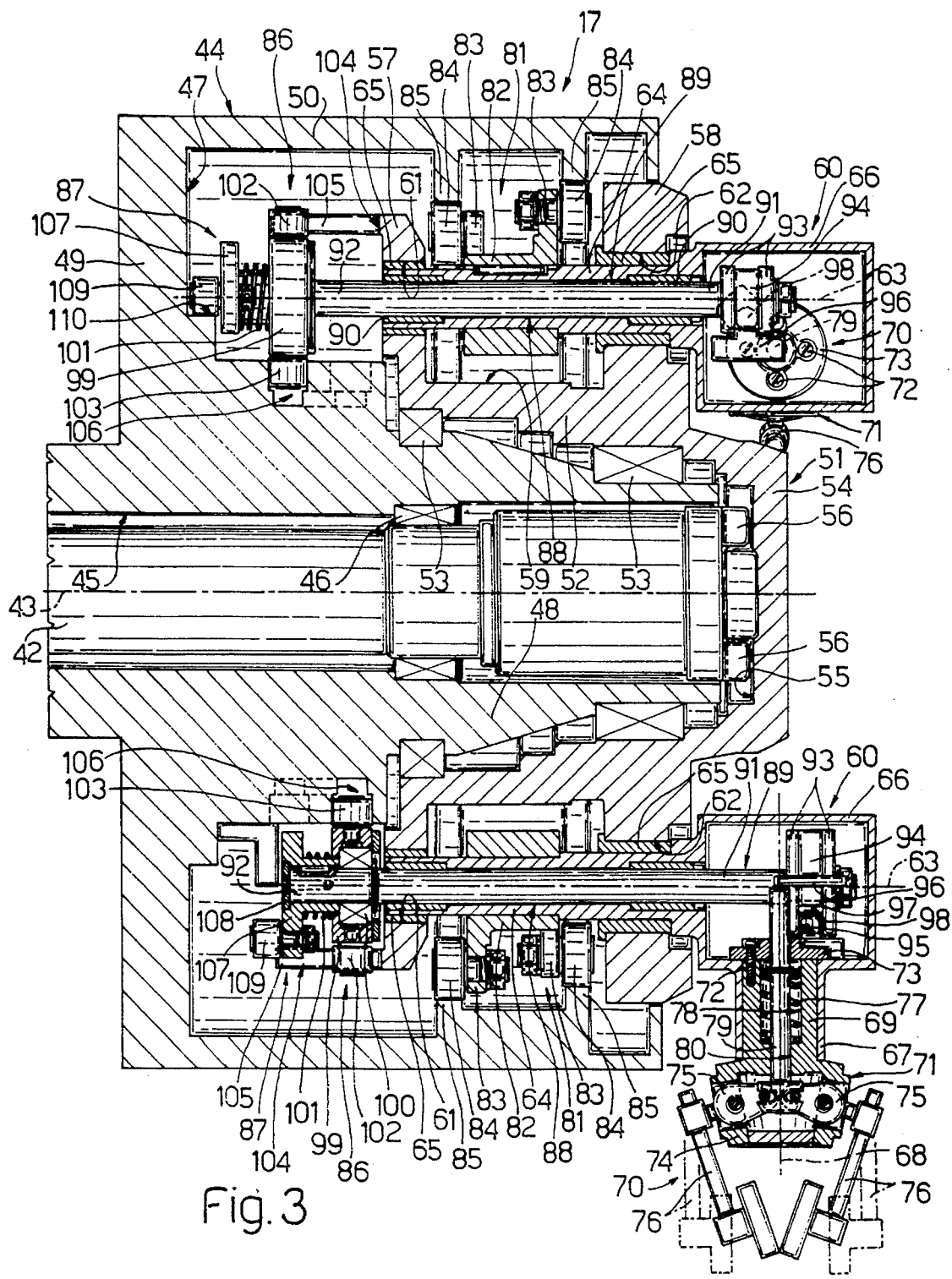

FIG. 2 shows a side view of the FIG. 1 machine;

FIG. 3 shows a larger-scale section along line III—III in FIG. 1;

FIG. 4 shows a view in perspective, with parts removed for clarity, of a detail in FIG. 3;

FIGS. 5 and 6 show schematic views in perspective of a detail in FIG. 3 in two different operating positions;

FIG. 7 shows a schematic larger-scale view in perspective of a detail in FIG. 1 in a given operating position;

FIG. 8 shows the FIG. 5 detail in an alternative operating position.

DETAILED DESCRIPTION OF THE INVENTION

Number 1 in FIGS. 1 and 2 indicates a wrapping machine for preferably but not necessarily elongated food products consisting in the example shown of sweets 2, but which may alternatively consist of chocolates, chocolate bars, etc.

Machine 1 presents a frame 3 comprising a vertical front wall 4 adjacent to which is a feed device 5 for supplying an orderly succession of sweets 2.

As shown in FIGS. 1 and 2, device 5 is of the type described and illustrated in Italian Patent Application n. BO92A 000384, to which full reference is made herein in the interest of full disclosure, and comprises (FIG. 5) a circular conveyor 6 for feeding sweets 2 in a direction 7 substantially parallel to the axis 8 of sweets 2, which are arranged longitudinally in relation to conveyor 6.

Alternatively (FIG. 8), said feed device consists of a known device 9 wherein a circular conveyor 6 feeds sweets 2 in a direction 7 perpendicular to axis 8 of sweets 2, which are arranged radially in relation to conveyor 6; or (FIG. 8) of a device 10 comprising a straight, substantially horizontal conveyor 11 parallel to wall 4 and traveling in a direction 7 perpendicular to axis 8 of sweets 2.

As shown in FIG. 1, machine 1 presents a wrapping device 12 comprising a first and second wrapping drum 13 and 14 tangent to each other at a transfer station 15, and which provides for mating each sweet 2 with a respective sheet 16 of wrapping material, and for folding sheet 16 about sweet 2 to form a tubular wrapping. Device 12 also comprises a transfer device 17 for withdrawing sweets 2 successively from feed device 5 (or 9 or 10) at a pickup or input station 18, and feeding them successively, and with a given orientation, to drum 13 of wrapping device 12 at a loading station 19.

Drum 13 is substantially a known type, and comprises a cylindrical roller 20 facing the outer surface of wall 4 and fitted to wall 4 so as to rotate clockwise (in FIG. 1) and at substantially constant angular speed about a horizontal axis 21 perpendicular to wall 4. Roller 20 is fitted with a number of gripping devices 22 projecting outwards of and equally spaced about the periphery of roller 20, and facing the end surface of roller 20 opposite that facing wall 4. As shown in FIGS. 6 and 7, each device 22 comprises a head 23 arranged radially in relation to roller 20 and perpendicularly to wall 4, and from the opposite lateral ends of which project two jaws 24 movable towards each other in a direction 25 substantially perpendicular to wall 4, so as to cooperate (FIG. 6) with the opposite longitudinal ends of a sweet 2 located in station 19 with its axis 8 perpendicular to wall 4. Each device 22 is fitted in known manner to roller 20 so as to swing, in relation to roller 20, about a respective axis 26, and so that, as it travels through stations 19 and 15, jaws 24 travel and are maintained as long as possible perpendicular to a plane (not shown) through station 19, 15 and tangent to roller 20.

As shown in FIG. 1, on leaving loading station 19 after receiving a sweet 2 from device 17, each device 22 feeds sweet 2 through a further loading station 27 where device 22 is supplied with a sheet 16 of wrapping material by a device 28 facing the periphery of roller 20 between stations 19 and 15 in the rotation direction of roller 20. As shown in FIGS. 6 and 7, for gripping respective sheet 16, each device 22 presents in known manner a further jaw 29 for gripping a first portion of sheet 16 against sweet 2; a second portion of sheet 16 being left to project radially outwards of sweet 2, and being folded in an L in known manner against sweet 2 on contacting a fixed plate 30 facing the periphery of roller 20 between stations 27 and 15 in the rotation direction of roller 20.

Drum 14 is substantially a known type, and comprises a cylindrical roller 31 facing the outer surface of wall 4 and fitted to wall 4 so as to rotate anticlockwise (in FIG. 1) and at substantially constant angular speed about a horizontal axis 32 perpendicular to wall 4. Roller 31 is fitted with a number of gripping devices 33 projecting outwards of and equally spaced about the periphery of roller 31, and facing the end surface of roller 31 opposite that facing wall 4. As shown in FIGS. 1 and 7, each device 33 comprises two jaws 34 movable towards each other in a direction 35 substantially parallel to wall 4, so as to cooperate (FIG. 7) with the lateral surface of a sweet 2 located in station 15 with its axis 8 perpendicular to wall 4, and held between the jaws 24 of a respective gripping device 22. Each device 33 is fitted in known manner to roller 31 so as to swing, in relation to roller 31, about a respective axis 36, and so that, as it travels through station 15 and through an output station 37 where roller 31 is substantially tangent to an output roller (not shown), jaws 34 travel and are maintained as long as possible perpendicular to a plane (not shown) through station 15, 37 and tangent to roller 31.

As shown in FIG. 7, at station 15, each device 33 grips respective sweet 2, together with part of respective sheet 16, inside a cavity 38 defined between jaws 34, and in such a manner that sheet 16 is folded in a U about sweet 2 and presents (FIG. 1) two lateral portions projecting radially outwards of cavity 38. Device 33 then feeds sweet 2 and sheet 16 to a folding station 39 where, as shown in FIG. 1, a known movable folding device 40 engages the rear projecting portion of sheet 16 (rear in relation to the traveling direction of sweet 2) and folds it on to sweet 2 prior to the front projecting portion being folded on contact with a fixed folding device 41 for completing the formation of a tubular wrapping about sweet 2, and consisting of a plate extending about the periphery of roller 31 up to station 37.

As shown particularly in FIG. 3, transfer device 17 comprises a drive shaft 42 fitted through wall 4 over feed device 5 and rotating anticlockwise (in FIG. 1) about a horizontal axis 43 parallel to axis 21; and a drum 44 coaxial with shaft 42 and supported in a fixed position on wall 4. Drum 44 presents an axial through hole 45 engaged by shaft 42 via the interposition of bearings 46; and, at the front, i.e. on the opposite side to that facing wall 4, an annular cavity 47 defining on drum 44 a central hub 48 fitted through with shaft 42 and having, on the end facing wall 4, an annular outer flange 49 from the outer periphery of which there extends frontwards an annular wall 50 coaxial with axis 43 and surrounding hub 48.

Hub 48 is fitted with a cup-shaped body 51 with its concavity facing wall 4, and comprising a lateral wall 52 extending coaxially with axis 43 inside a front portion of cavity 47 and connected in rotary manner to hub 48 via the interposition of bearings 53. Body 51 also comprises a bottom wall 54 perpendicular to axis 43 and having a diametrical inner groove 55 engaged by two axial appendixes 56 on shaft 42, for connecting body 51 angularly to shaft 42. Wall 52 presents a first and second annular outer flange 57 and 58 defining an annular groove 59 and extending perpendicular to axis 43, the first inside cavity 47, and the second so as to substantially close the inlet of cavity 47.

Body 51 supports a number of transfer units 60 equally spaced about axis 43 and each designed to pick up a sweet 2 from device 5 (or 9 or 10) at pickup station 18, and transfer it to a gripping device 22 on drum 13 at loading station 19.

As shown in FIG. 3, for each unit 60, flanges 57 and 58 present respective holes 61 and 62 coaxial with a respective axis 63 parallel to axis 43; and each unit 60 comprises a sleeve 64 coaxial with respective axis 63 and mounted in rotary and axially-fixed manner through respective holes 61 and 62 via the interposition of supports 65. The front end of sleeve 64 projecting frontwards of flange 58 is fitted integral with a hollow prismatic body 66 having a cylindrical tubular lateral appendix 67 with an axis 68 extending transversely and obliquely in relation to axis 63.

Appendix 67 is fitted through with a rotary cylindrical body 69 of a gripping device 70 comprising a substantially cup-shaped head 71 connected integrally to the outer end of body 69, the inner end of which is fitted by means of screws 72 with a plate 73 housed in rotary manner inside body 66 and for axially securing body 69 in relation to appendix 67. Head 71 presents a lateral wall 74 coaxial with axis 68 and having two diametrically-opposed through openings in which pivot respective rocker arms 75 substantially radial in relation to head 71, and a first arm of which extends inwards of head 71, and a second arm of which is fitted integral with a jaw 76 extending outwards in a direction substantially parallel to axis 68. Rocker arms 75 swing in opposite directions in a diametrical plane of head 71, so as to swing jaws 76, in said diametrical plane, from a normally closed position (shown by the continuous line in FIG. 3) to an open operating position (shown by the dotted line in FIG. 3), and against the thrust exerted by a helical spring 77 coaxial with axis 68 and compressed inside an axial cavity 78 in body 69, between the end surface of cavity 78 and the plate of a shaft 79 controlling rocker arms 75. Shaft 79 is coaxial with axis 68 and engages in sliding manner an axial hole 80 in body 69 so that, when moved axially towards head 71 and against the action of spring 77, it provides for rotating rocker arms 75 and opening jaws 76. Shaft 79 also extends through plate 73, and presents an end portion extending inside body 66.

By means of a first actuating device 81, each gripping device 70 swings about respective axis 63 and about a central position wherein body 69 of device 70 is positioned substantially radially in relation to axis 43. As shown in FIG. 3, actuating device 81 comprises a bush 82 fitted to sleeve 64 between flanges 57 and 58 and having, at opposite ends, two radial, angularly offset appendixes 83 supporting respective revolving tappet rollers 84 parallel to axis 63 and cooperating with respective fixed drum cams 85 formed on the inner surface of wall 50. Cams 85 are so formed as to swing gripping devices 70 about respective axes 63 in such a manner that, on approaching conveyor 6 (or 11), each device 70 is positioned substantially perpendicular to conveyor 6 (11), and travels through station 18 substantially parallel to itself and moving axially first towards conveyor 6 (11) to grip sweet 2, and then in the opposite direction to remove it. Similarly, cams 85 are so formed as to operate each device 70 in the same way at station 19, so as to enable sweet 2 to be transferred from device 70 to device 22 as shown in FIG. 6, and in such a manner that devices 70 and 22 are maintained aligned with each other and travel a given distance substantially transversely to themselves.

Each device 70 also presents a second actuating device 86 for rotating head 71 substantially 90° about axis 68 and between a first position (FIGS. 3 and 5) wherein jaws 76 lie in a plane parallel to axis 43 and to the FIG. 3 plane, and a second position (FIGS. 6 and 8) wherein jaws 76 lie in a plane perpendicular to axis 43 and to the FIG. 3 plane. Each device 70 also presents a third actuating device 87 for axially pushing shaft 79 against the action of spring 77 and so opening jaws 76.

Actuating devices 86 and 87 have in common a drive member 88 comprising a shaft 89 coaxial with axis 63 and mounted in rotary and axially-sliding manner through sleeve 64 via the interposition of supports 90. Shaft 89 comprises a front portion 91 projecting frontwards from sleeve 64 and housed inside body 66; and a rear portion 92 housed inside cavity 47 behind flange 57. Portion 91 of shaft 89 is fitted with two annular plates 93 separated by an intermediate body 94 defining, between plates 93, a groove 95 extending transversely to axis 63 and substantially facing plate 73. From body 94 there projects laterally an appendix 96 in the form of a flat plate facing the inner end of shaft 79, substantially radial in relation to shaft 89, and substantially perpendicular, when idle, to axis 68.

As shown in FIGS. 3 and 4, plate 73 presents an eccentric pin 97 parallel to axis 68 and supporting for rotation a roller 98 engaging groove 95.

Device 86 comprises a ring 99 mounted for rotation on shaft 89 via the interposition of a bearing 100, and fixed axially on bearing 100 and in relation to shaft 89 by a spring 101. From ring 99 there project outwards two diametrically-opposed radial pins supporting for rotation respective rollers 102 and 103. Roller 102 engages an axial opening 104 on body 51, and travels along an axial appendix 105 extending rearwards from the periphery of flange 57 for preventing ring 99 from rotating about axis 63 in relation to body 51. Roller 103 on the other hand is a tappet roller which engages a cam defined by an annular groove 106 formed on the rear portion of hub 48 and along which roller 103 travels when body 51 is rotated in relation to hub 48. For each turn of body 51 about axis 43, groove 106 is so formed as to move shaft 89 back and forth, which movement, by virtue of the crank defined by plate 73 and eccentric roller 98, results in two substantially 90° rotations in opposite directions of head 71 and device 70 as of the position shown at the bottom of FIG. 3. More specifically, groove 106 is so formed as to maintain device 70 in a first position (shown at the bottom of FIG. 3) as it travels through station 18; rotate device 70 about axis 68 into a second position turned 90° in relation to said first position before reaching station 19; and restore device 70 to the first position before reaching station 18. As shown in FIG. 2, when device 70 is set to said first position, the diametrical plane of head 71 containing jaws 76 is perpendicular to the traveling direction 7 of sweets 2, whereas it is parallel to direction 7 when device 70 is set to said second position.

Obviously, by eliminating roller 103 and locking roller 102 inside opening 104 in the backup position shown at the top of FIG. 3, device 70 may be maintained permanently in the second position wherein jaws 76 lie in a plane perpendicular to axis 43 and parallel to direction 7.

As shown in FIG. 3, device 87 comprises a crank 107 fixed angularly on the end of shaft 89 by means of a screw device 108 and constituting an axial stop for spring 101. Crank 107 is fitted with an eccentric pin on which is mounted for rotation a tappet roller 109 parallel to axis 63 and cooperating with a drum cam 110 formed on the rear portion of hub 48. Cam 110 is so formed as to rotate shaft 89 and appendix 96 first in one direction and then in the other about axis 63, so that appendix 96 axially displaces shaft 79 in such a manner that jaws 76 are opened before reaching station 18, closed at station 18, opened at station 19, and closed on leaving station 19.

In actual use, each sweet 2 supplied by feed device 5, 9 or 10 arrives at station 18 simultaneously with a respective transfer unit 60 which, before reaching station 18, is rotated anticlockwise (in FIG. 1) about respective axis 63 by respective actuating device 81 as described above, so that gripping device 70 is perpendicular to conveyor 6 or 11; and jaws 76 of said transfer unit 60 are opened by respective actuating device 87 and kept open up to station 18.

If, as shown in FIG. 5, sweets 2 are arranged with axis 8 substantially parallel to direction 7, the plane of jaws 76 of said unit 60 is rotated, by respective actuating device 86 and prior to operation of actuating device 81, from a position substantially parallel to a position substantially perpendicular to direction 7 in station 18. Consequently, on sweet 2 and respective gripping device 70 reaching station 18, jaws 76 may be positioned on either side of sweet 2, grip it transversely by the intermediate portion, and so remove it off the feed conveyor.

Once gripped, sweet 2 is lifted up towards station 19 by device 70 which is rotated by actuating device 86 about axis 68 so that the plane of jaws 76 is again parallel to direction 7 in station 19 where jaws 24 of a respective gripping device 22 grip sweet 2 axially for enabling it to be wrapped in sheet 16.

If, as shown in FIG. 8, sweets 2 are arranged with axis 8 substantially perpendicular to direction 7 in station 18, the plane of jaws 76 of unit 60 is maintained, as already stated, permanently parallel to direction 7 by removing, say, roller 103 and locking shaft 89 in the backup position shown at the top of FIG. 3.

I claim:

1. A wrapping machine, particularly for food products, comprising an input station for an orderly succession of said products supplied to the input station in a given direction lying in a first plane, said input station being arranged on said first plane; a device for wrapping said products; a loading station for loading said products on to the wrapping device, said loading station being arranged on said first plane; and a transfer device for transferring said succession in said first plane from the input station to the loading station; the transfer device comprising at least a gripping device moving between the input and loading stations; and the gripping device comprising jaw means mounted for movement in a second plane for gripping a respective product at the input station, wherein said gripping device is rotated about a first axis lying in said first plane for selectively positioning said plane in a first position substantially coplanar, and in a second position substantially perpendicular, to said first plane.

2. A machine as claimed in claim 1, further comprising first actuating means connected to the gripping device for selectively setting said second plane to said first and second positions.

3. A machine as claimed in claim 2, further comprising second actuating means connected to said gripping device for opening said gripping device; said first and second actuating means comprising common drive means.

4. A machine as claimed in claim 3, wherein said common drive means comprise a first shaft extending along a second axis crosswise in relation to said first axis, and connected to said first and second actuating means so as to rotate about said second axis by virtue of said first actuating means, and move axially in reciprocating manner by virtue of said second actuating means.

5. A machine as claimed in claim 4, wherein said second axis is oblique in relation to said first axis; said first shaft having a substantially radial appendix mounted for rotation with the first shaft about said first axis and said gripping device comprising a second shaft for controlling said jaw means and moved along said first axis by said appendix.

6. A machine as claimed in claim 4 or 5, further comprising elastic axial return means connected to said second shaft for maintaining the second shaft contacting said appendix.

7. A machine as claimed in claim 4 or 5, wherein said gripping device comprises a body supporting said jaw means; said supporting body rotating about said first axis; and crank means being fitted to said supporting body and being connected to said first shaft for rotating said jaw means about said first axis and between said first and second positions subsequent to axial displacement of said first shaft.

8. A machine as claimed in claim 4, further comprising third actuating means connected to said gripping device for swinging the gripping device about said second axis.

9. A machine as claimed in claim 8, wherein each actuating means is a cam actuating means.

10. A machine as claimed in claim 4, further comprising means for supporting a number of said gripping devices; said supporting means being rotatable about a third axis parallel to said second axis for moving each said gripping device between said input and loading stations.

\* \* \* \* \*